US006742185B1

(12) United States Patent
Andrews

(10) Patent No.: US 6,742,185 B1
(45) Date of Patent: May 25, 2004

(54) VIDEO SCREEN MODULE ENDCAP WIRELESS SIGNAL TRANSMITTER

(75) Inventor: Christopher E. Andrews, South Lyon, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/397,469

(22) Filed: Mar. 27, 2003

(51) Int. Cl.[7] .................................................. H04N 7/18
(52) U.S. Cl. ............................ 725/75; 725/81; 348/837
(58) Field of Search ........................... 725/75, 81, 133, 725/141, 153, 74, 76, 77; 348/837, 734; 312/7.2, 30, 242, 248, 249.7; 224/311; D14/125; 455/91, 92, 99; 248/923

(56) References Cited

U.S. PATENT DOCUMENTS

| 4,977,618 | A | * | 12/1990 | Allen .......................... 398/127 |
| 5,987,205 | A | * | 11/1999 | Moseley et al. ............. 385/125 |
| 6,424,442 | B1 | * | 7/2002 | Gfeller et al. ............... 398/135 |
| 6,522,368 | B1 | * | 2/2003 | Tuccinardi et al. .......... 348/837 |
| 2003/0083024 | A1 | * | 5/2003 | Richenstein .................. 455/99 |

* cited by examiner

Primary Examiner—Chris Grant
Assistant Examiner—Dominic Saltarelli
(74) Attorney, Agent, or Firm—MacMillan, Sobanski & Todd, LLC

(57) ABSTRACT

A vehicle entertainment system for distributing a wireless information signal within a vehicle comprises a reproduction device that generating a video signal and an auxiliary signal. A video screen moveable between a viewing position and a stowed position and displays the video signal to the viewing area when the video screen is in the viewing position. A first emitter port that is moveable with the video screen irradiates the wireless information signal throughout the viewing area in response to the auxiliary signal when the video screen is in the viewing position. A second emitter port irradiates the wireless information signal throughout the viewing area when the video screen is in the stowed position.

27 Claims, 3 Drawing Sheets

VIDEO SCREEN MODULE ENDCAP WIRELESS SIGNAL TRANSMITTER

CROSS-REFERENCES TO RELATED APPLICATIONS

None.

STATEMENT REGARDING FEDERALLY SPONSORED RESEARCH

None.

BACKGROUND OF INVENTION

1. Field of Invention

This invention relates to a system that transmits infrared signals to multimedia devices throughout the interior of a vehicle.

2. Description of Related Art

Transmission of audio and video signals within a vehicle has typically been accomplished by hardwiring a multimedia source to an output device such as speakers, headphones, and video display units. As the practice of equipping a vehicle with several different types of multimedia devices becomes more prevalent, manufacturing complexity increases and additional space is needed to package and route wiring harnesses for video and audio signal transmissions. Also, as vehicle manufacturers increase the number of other electronic component control modules within the vehicle, such as safety modules, RKE modules, and the like, such modules are packaged in various concealed locations such as the interior of doors and other trim panels. As a result, vehicle manufactures must be innovative in how to accommodate the routing of wire harnesses while avoiding these populated areas. Vehicle manufacturers are constantly looking for alternative solutions so as to reduce complexity and alleviate overcrowded packaging areas.

Another issue vehicle manufacturers must take into consideration when transmitting audio and video signals through a bus system in a vehicle is electromagnetic interference (EMI). EMI generated by electrical devices may cause electrical distortion in other surrounding electrical components. In the past, audio and video signals have been very susceptible to EMI since these signals have traditionally been transmitted through wire harnesses often in close proximity to other electrical devices or an other wiring harness conducting or radiating EMI. A possible solution that has been used to suppress EMI caused by the various electrical devices is to either shield or filter the source of the EMI or the electrical device being interfered with. Filtering is performed by adding electronics such as capacitors and inductors in or at the source generating the EMI. Shielding may be installed at the source of the EMI by encasing or packaging the source of the EMI with an insulating material such as foil to prevent the radiation from escaping. Shielding can also be used on cables and wire harnesses to prevent radiation from escaping or entering into the cable or the wire harness. While electromagnetic shields and filters are commonly used to prevent the magnetic radiation from entering or escaping the electrical devices, such prevention measures can add part complexity and cost.

Another issue when using wiring to route audio or video signals, is that when using a listening device such as headphones for receiving the audio from a multimedia output unit, either an accessible output jack or port must be located in close proximity to the listener or a headphone chord must be long enough to reach the output jack or port. In many instances, a single rear seat control unit is installed in one location having one or two output jacks or ports for the listener to plug into, such that several seating positions are relatively far away from the jacks. A further problem arises when more passengers want to listen to the multimedia program using headphones than there are available output jacks or ports. If an output jack or port is provided at each seat location for every passenger in the vehicle, wiring hardware costs are unacceptably high.

Wireless communication of audio signals using infrared wavelength is well-known in the art for transmitting data from a source to a receiver. Wireless headphones are devices that have been used to achieve reception of a transmitted wireless DVD data signal in vehicles. However in current production systems, a transmitter is located on a same side as the video screen and transmits the data signal at those passengers able to view the video screen. Since the data signal is transmitted to only those passengers able to view the video screen, passengers of a vehicle unable to view the video screen are not able to receive the data signal. Another disadvantage with current production systems is when the video screen is in the closed position the video screen is concealed. If the transmitter is located on the same side of the video screen then the transmitter is also concealed and is unable to transmit the data signal to any passenger within the vehicle.

It would be desirable to provide a multimedia system for allowing multiple passengers in a vehicle to listen to multimedia programs whereby the data signal is transmitted to every listener in a vehicle without the use of communication by wire. Such a device that uses wireless communication from an open or closed video screen module located within the interior compartment of a vehicle that outputs audio content of a plurality of multimedia devices to every passenger in a vehicle would overcome such disadvantages.

SUMMARY

Consonant with the present invention, a video screen module for a vehicle entertainment system contains a first and a second emitter port that provides a wireless information signal to a viewing area in a vehicle when the video screen is in a viewing or stowed position.

The vehicle entertainment system for distributing the wireless information signal within the vehicle comprises a reproduction device that generates a video signal and an auxiliary signal. The system includes a video screen moveable between a viewing position and a stowed position and displays the video signal to the viewing area when the video screen is in the viewing position. A first emitter port that is moveable with the video screen irradiates the wireless information signal throughout a viewing area in response to the auxiliary signal when the video screen is in the viewing position. A second emitter port irradiates the wireless information signal throughout the viewing area when the video screen is in the stowed position.

BRIEF DESCRIPTION OF THE DRAWINGS

A more complete appreciation of the present invention and many of its advantages will be readily obtained as they become better understood by reference to the following detailed description when considered in connection with the accompanying drawings and detailed specification.

DETAILED DESCRIPTION OF THE PREFERRED EMBODIMENTS

Figure 1:
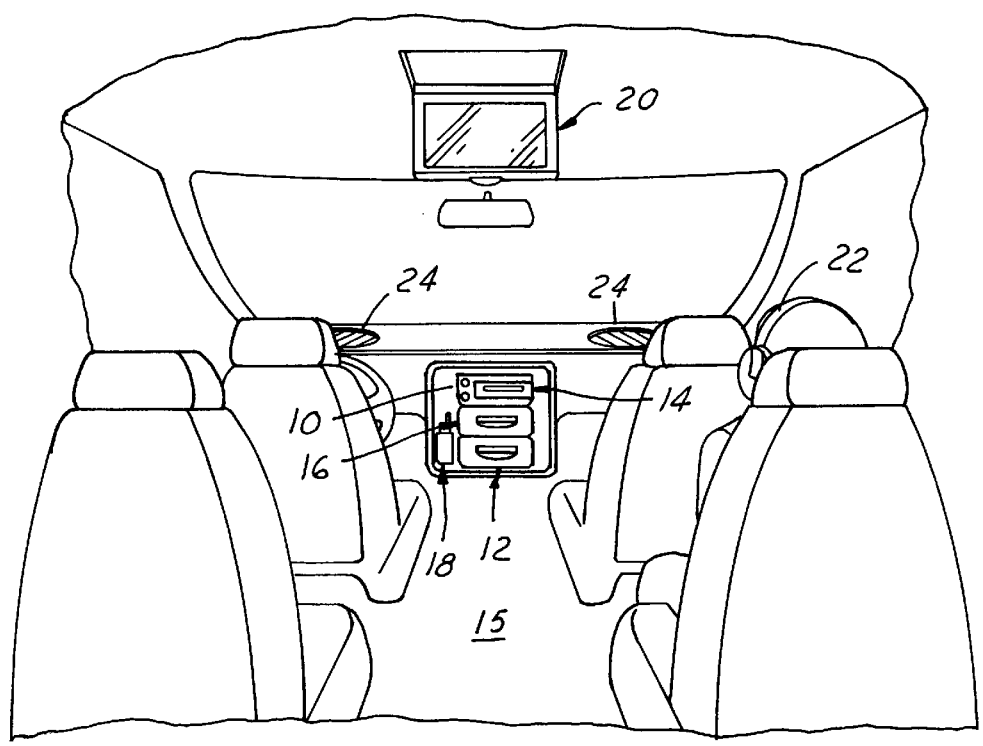
FIG. 1 is a view of an interior compartment of a vehicle showing a vehicle entertainment system and a video screen module.

Referring now to the Drawings and particularly to FIG. 1, there is shown a vehicle entertainment system within an interior of a vehicle according to the present invention. The vehicle entertainment system comprises at least one multimedia device for outputting a multimedia program to the occupants of the vehicle. A multimedia device could be a radio receiver 10, a CD player 12, a tape player 14, a DVD player 16, or a mobile phone 18. Other multimedia devices may include MP3 players, television receivers, digital video players, satellite videos, personal audio players, personal video players, or a hard drive system. A video screen module 20 is mounted to the headliner of the interior compartment just rear of a front passenger seat. This provides an optimum view for all rear seat passengers of the vehicle within a viewing area 15. Alternatively, the video screen module 20 may be mounted in other location visible to the rear seat passengers such as a back of a headrest of the front passenger seat, or a console surface. The video screen module 20 contains an infrared transmitter for irradiating a wireless information signal to receiving units within viewing area 15. The wireless information signal is preferably an audio signal using infrared light as a transmission mode. Receiving units such as a wireless headphone 22 worn by occupants or wireless speakers 24 situated throughout the vehicle receive the wireless information signal and generate an audio output. The receiving units usually consist of an infrared detector for detecting and receiving the infrared signal, a demodulator for recovering an audio signal from a modulated signal, and a speaker to output the audio content. Alternatively, the wireless information signal can be a control signal, text data, or other information signals depending on the multimedia application.

Figure 2:
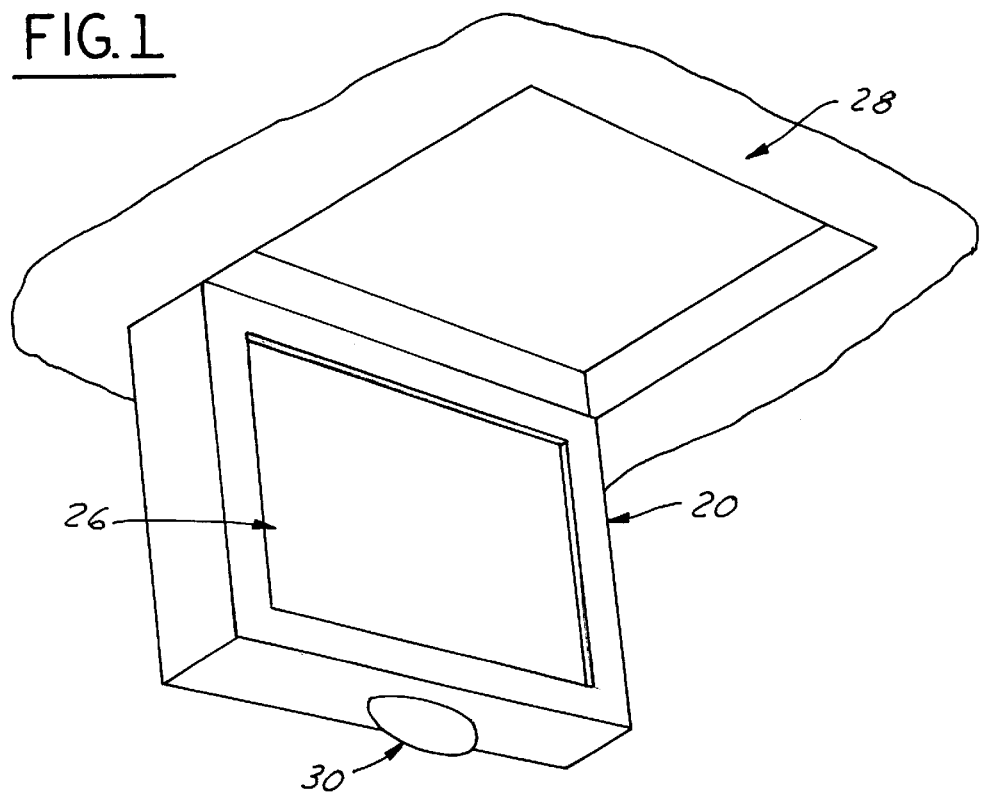
FIG. 2 is a perspective view of a video screen module according to a preferred embodiment.

FIG. 2 illustrates a preferred embodiment of the video screen module in a viewing position. The video screen module 20 is a device for receiving a video signal from a reproduction device and displaying video content of the video signal. The reproduction device may be a DVD player 16, a video player, or a television receiver. The reproduction device may be integrated into video screen module 20 so that the video signal is transmitted internally. A video screen 26, such as a LCD monitor, displays the video content to the passengers of the vehicle. The video screen 26 is moveable between a viewing position and a stowed position. While in the viewing position, the video screen 26 displays the video content to a viewing area for passengers of the vehicle to watch. When in the stowed position, the video screen 26 recesses into an overhead pod 28 and is no longer accessible for viewing. An endcap 30 is located on an end of the video screen 26. In a preferred embodiment, the endcap 30 is located on the bottom of the video screen 26 and at least a portion of it is visible when in either the viewing position or the stowed position.

Figure 3:
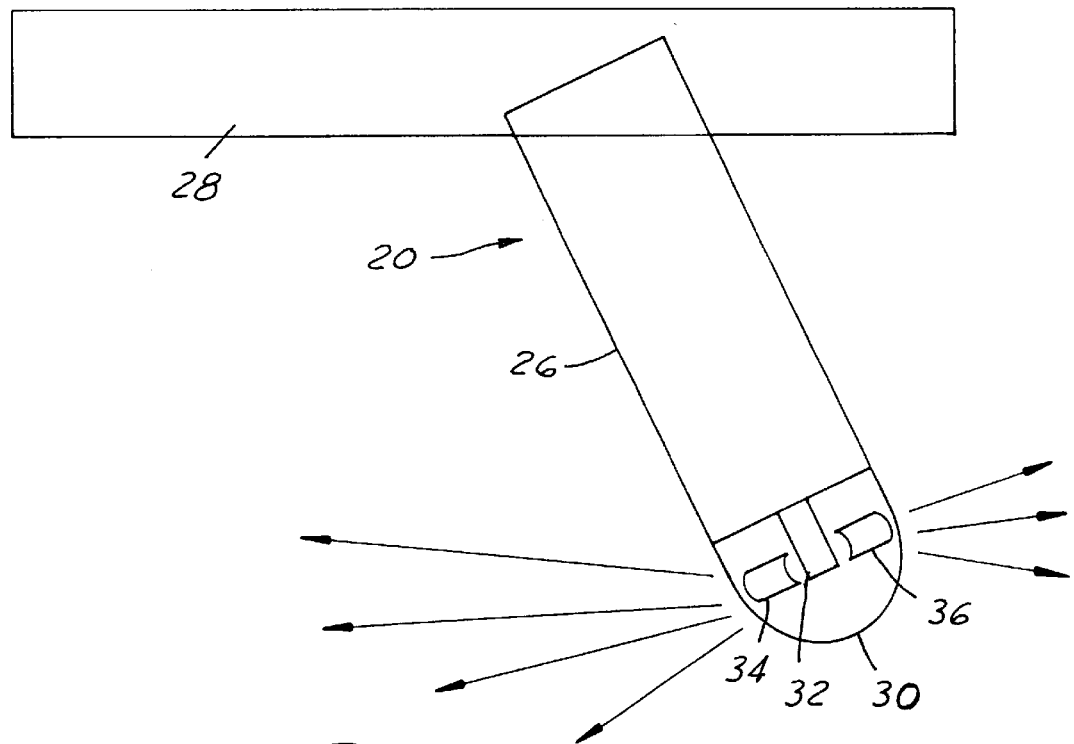
FIG. 3 a side view of a video screen module in a viewing position showing first and second emitter port dispersing an irradiating signal according to a first embodiment.

FIG. 3 illustrates the video screen module 20 in the viewing position. The endcap 30 is a protective cover located on the bottom of the video screen 26 that encloses a printed circuit board 32, a first infrared light emitting diode (LED) 34, and a second infrared LED 36. The endcap 30 is made of a conventional infrared transparent material that allows the transmission of infrared light waves to penetrate through the endcap 30. The first infrared LED 34 with without lens is attached to a first surface of the printed circuit board 32 using leads and is positioned so as to direct infrared radiation into the viewing area when the video screen 26 is in the viewing position. Alternatively, different characteristic infrared LEDs can be used such as surface mount devices and LEDs with lens.

The first infrared LED 34 comprises a first emitter port for covering the viewing area when in the viewing position. The first emitter port irradiates the wireless information signal to the viewing area so that passengers utilizing the wireless headphone 22 receive the wireless information signal (e.g. audio track of a DVD video disc). The wireless information signal is preferably modulated as known in the art. Depending on the location of the video screen module 20 within the vehicle, the second infrared LED 36 may be active and simultaneously irradiating the wireless transmission signal to other areas of the vehicle. For instance, if a passenger is located in a position wherein the passenger is not capable of viewing the video screen 26, such as forward of the video screen 26 in the front seat, the passenger unable to view the video screen 26 may still desire to listen to the audio content of video program. The second infrared LED 36 would irradiate the wireless information signal to the passenger located forward of the video screen 26. If the video screen module is located within the vehicle where all passengers are rearward of the video screen, then the second infrared LED may not need to be active and can be turned off to reduce power consumption.

Figure 4:
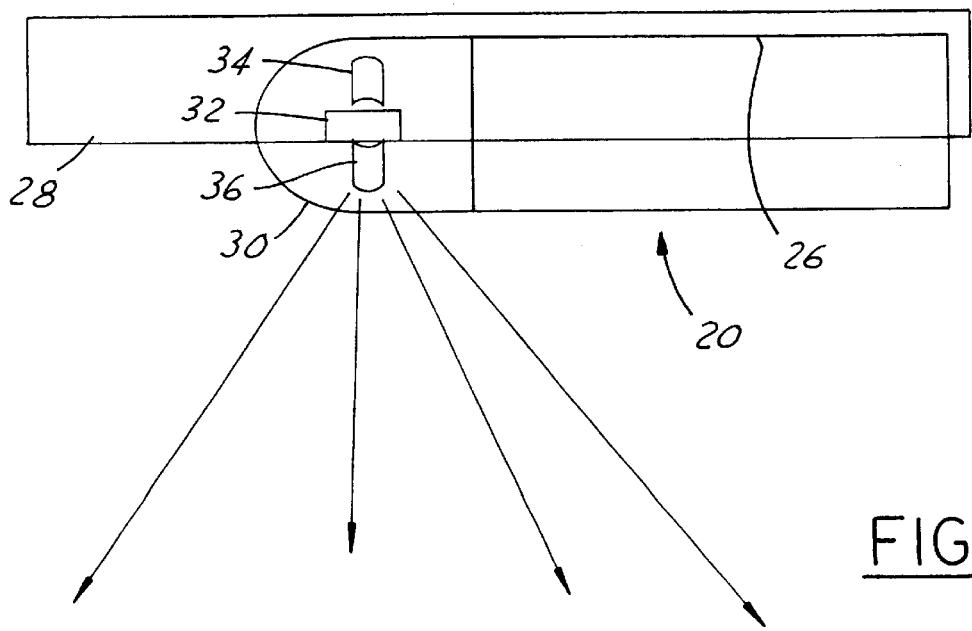
FIG. 4 is a side view of the video screen module of FIG. 3 in a stowed position showing the dispersion of an irradiating signal.

FIG. 4 illustrates the video screen module 20 in the stowed position. The second infrared LED 36 is attached to a second surface of the printed circuit board 32 and is positioned so as to irradiate the viewing area when the video screen 26 is in the stowed position, thereby providing a second emitter port. The second emitter port irradiates the wireless information signal to the viewing area wherein passengers wearing the wireless headphones 22 receive the wireless information signal. Although video content will be unavailable for viewing when the video screen 26 is in the stowed position, the wireless information signal containing the audio content of a video broadcast can continue to irradiate from the second emitter port to the wireless headphones 22. An audio signal from an audio player such as the CD player 12, the tape player 14, the broadcast radio receiver 10, the mobile phone 18, or the MP3 player may also be irradiated by the second emitter port to the wireless headphone 22. The wireless information signal can also include a live broadcast signal or a recorded broadcast signal.

Figure 5:
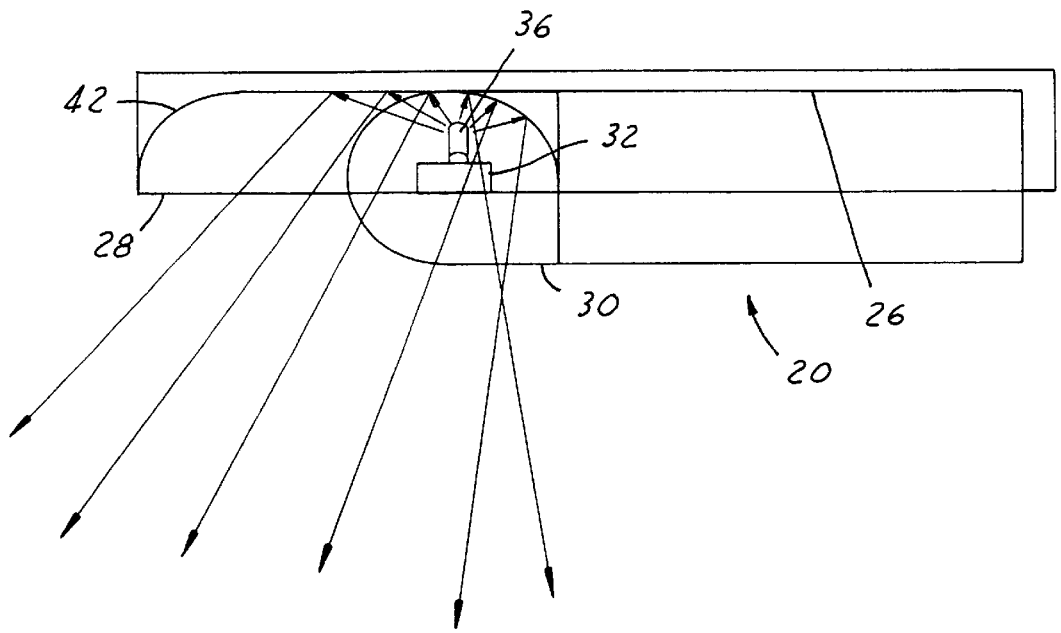
FIG. 5 is a side view of a video screen module in a stowed position showing a second emitter port according to a second embodiment.

In other embodiments of the invention, the first and second emitter ports may share the same infrared LED. FIG. 5 illustrates a video screen module 20 irradiating a wireless information signal from a second emitter port when in the stowed position according to a second embodiment. The second emitter port includes a deflector plate 42 located in the overhead pod 28. The deflector plate 42 is positioned above the first infrared LED 34 when in the stowed position.

The first infrared LED 34 irradiates the wireless information signal toward the deflector plate 42 which reflects the wireless information signal to the viewing area of the vehicle. The deflector is a mirror-like surface and can be made of any material that reflects infrared light waves.

Figure 6:
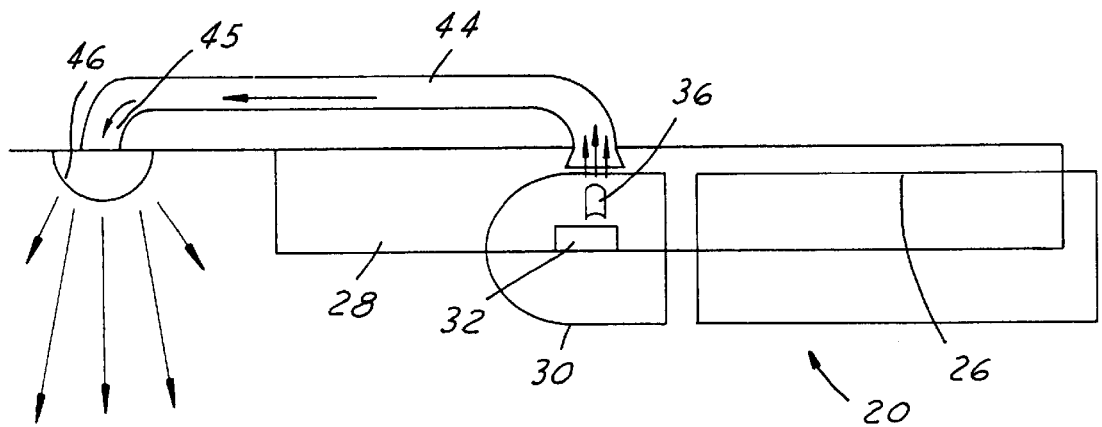
FIG. 6 is a side view of a video screen module in a stowed position showing a second emitter port according to a third embodiment.

FIG. 6 illustrates a video screen module 20 irradiating a wireless information signal from a second emitter port when in the stowed position according to a third embodiment. The second emitter port includes a light communication channel 44 located in the overhead pod 28. The first infrared LED 34 irradiates the wireless information signal into the light communication channel 44 which directs the wireless information signal to one or more output channels 45. The output channels may be located above each seating location throughout the vehicle so as to provide the wireless information signal to each passenger of the vehicle, for example, a concave lens 46 may be used to disperse and irradiate the wireless information signal while exiting the output channel 45 at each seating location. Channels 44 and 45 may comprise a light pipe, or optical fiber, or a light communication matrix for example.

From the foregoing description, one ordinarily skilled in the art can easily ascertain the essential characteristics of this invention and, without departing from the spirit and scope thereof, can make various changes and modifications to the invention to adapt it to various usages and conditions. For example, although only one design is shown to use a single channel communication system, it will be readily apparent to those skilled in the art to utilize a multi-channel communication transmitter. Also, although the preferred embodiment is shown to implement the vehicle entertainment system in an automobile vehicle, it will be readily apparent to those skilled in the art that the vehicle entertainment system can be implemented in any transportation device such as trucks, boats, planes, or trains.

What is claimed is:

1. A vehicle entertainment system for distributing a wireless information signal within a vehicle comprising:
   a reproduction device for generating a video signal and an auxiliary signal;
   a video screen moveable between a viewing position and a stowed position for displaying said video signal to a viewing area when in said viewing position;
   a first emitter port moveable with said video screen for irradiating said wireless information signal throughout said viewing area in response to said auxiliary signal when said video screen is in said viewing position; and
   a second emitter port for irradiating said wireless information signal throughout said viewing area when said video screen is in said stowed position.

2. The vehicle entertainment system of claim 1 wherein said first emitter port includes at least a first infrared LED for irradiating said wireless information signal throughout said viewing area.

3. The vehicle entertainment system of claim 2 wherein said second emitter port includes a second infrared LED for irradiating said wireless information signal throughout said viewing area.

4. The vehicle entertainment system of claim 3 further including a printed circuit board wherein said first infrared LED is located on a first surface of said printed circuit board and said second infrared LED is located on a second surface of said printed circuit board.

5. The vehicle entertainment system of claim 2 wherein said second emitter port includes a deflector plate for reflecting said wireless information signal of said first infrared LED throughout said viewing area.

6. The vehicle entertainment system of claim 2 wherein said second emitter port includes a light communication channel for channeling said wireless information signal of said first infrared LED throughout said viewing area.

7. The vehicle entertainment system of claim 1 further comprising an endcap located on an end surface of said video screen containing said first emitter port.

8. The vehicle entertainment system of claim 7 wherein said endcap is made of a transparent material.

9. The vehicle entertainment system of claim 1 wherein said wireless information signal is a modulated audio signal.

10. The vehicle entertainment system of claim 1 wherein said auxiliary signal is an audio track of a reproduced video program.

11. The vehicle entertainment system of claim 1 wherein said reproduction device includes a television receiver and said auxiliary signal is television audio.

12. The vehicle entertainment system of claim 1 wherein said reproduction device includes a DVD player and said auxiliary signal is DVD audio.

13. The vehicle entertainment system of claim 1 further comprising an audio player wherein said wireless information signal irradiated from second port comprises an audio signal.

14. The vehicle entertainment system of claim 13 wherein said audio player includes a CD player and said audio signal is CD audio.

15. The vehicle entertainment system of claim 13 wherein said audio player includes a MP3 player and said audio signal is MP3 audio.

16. The vehicle entertainment system of claim 13 wherein said audio player includes a tape player and said audio signal is tape audio.

17. The vehicle entertainment system of claim 13 wherein said audio player includes a broadcast radio receiver and said audio signal is radio audio.

18. The vehicle entertainment system of claim 13 wherein said audio player includes a mobile phone and said audio signal is mobile phone audio.

19. The vehicle entertainment system of claim 1 further comprising a wireless receiving unit located in said viewing area for receiving said irradiating signal.

20. The vehicle entertainment system of claim 19 wherein said receiving unit is a wireless headphone.

21. The vehicle entertainment system of claim 20 wherein said receiving unit comprises an infrared detector, a demodulator, and a speaker.

22. A video screen module for receiving an information signal from a multimedia device and transmitting a wireless information signal within a vehicle comprising:
   a video screen moveable between a viewing position and a stowed position for displaying a video signal to a viewing area when in said viewing position;
   a first emitter port moveable with said video screen for irradiating a wireless information signal throughout said viewing area when said video screen is in said viewing position; and
   a second emitter port for irradiating said wireless information signal to said viewing area when said video screen is in said stowed position.

23. The video screen module of claim 22 wherein said first emitter port includes at least a first infrared LED for irradiating said wireless information signal throughout said viewing area.

24. The video screen module of claim 23 wherein said second emitter port includes a second infrared LED for irradiating said wireless information signal throughout said viewing area.

25. The video screen module of claim 23 wherein said second emitter port includes a deflector plate for reflecting said wireless information signal of said first infrared LED throughout said viewing area.

26. The video screen module of claim 23 wherein said second emitter port includes a light communication channel for channeling said wireless information signal of said first infrared LED throughout said viewing area.

27. The video screen module of claim 22 wherein said wireless information signal is a modulated audio signal.

* * * * *